(12) United States Patent
McDowell et al.

(10) Patent No.: US 7,351,124 B2
(45) Date of Patent: Apr. 1, 2008

(54) WATER-TIGHT DRIVE-PENETRATION COMPARTMENT

(75) Inventors: Robert McDowell, Branson, MO (US); Frank English, Branson, MO (US); Brian Deckard, Czork, MO (US)

(73) Assignee: Ride the Ducks International, LLC, Branson, MO (US)

( * ) Notice: Subject to any disclaimer, the term of this patent is extended or adjusted under 35 U.S.C. 154(b) by 0 days.

(21) Appl. No.: 11/463,222

(22) Filed: Aug. 8, 2006

(65) Prior Publication Data

US 2008/0038966 A1    Feb. 14, 2008

(51) Int. Cl.
*B63F 3/00* (2006.01)
(52) U.S. Cl. .................... 440/12.51; 440/12.59
(58) Field of Classification Search ............... 440/12.2, 440/12.51, 12.52, 12.53, 12.54, 12.57, 12.58, 440/12.59, 12.6, 12.61, 12.66
See application file for complete search history.

(56) References Cited

U.S. PATENT DOCUMENTS

| 2,341,165 | A | * | 2/1944 | Todd | 440/88 R |
| 2,406,288 | A | * | 8/1946 | Hait | 440/12.64 |
| 3,155,070 | A | * | 11/1964 | Jebens et al. | 440/4 |
| 6,152,527 | A | | 11/2000 | McDowell | |
| 6,280,266 | B1 | | 8/2001 | Sandgren et al. | |
| 6,482,052 | B1 | * | 11/2002 | Giljam | 440/12.51 |
| 6,575,796 | B1 | * | 6/2003 | McDowell | 440/12.57 |

\* cited by examiner

*Primary Examiner*—Sherman Basinger
(74) *Attorney, Agent, or Firm*—Husch & Eppenberger LLC; Rebecca J. Brandau

(57) ABSTRACT

A water-tight compartment for containing a penetration point on the hull of an amphibious vehicle, comprising a bottom panel comprising the hull of the amphibious vehicle; a forward panel of the box comprising a forward bulkhead of the amphibious vehicle; a rearward panel of the box comprising a rearward bulkhead of the amphibious vehicle; two lateral panels; and a top panel; wherein the panels are joined together in a water-tight manner and wherein there is a water-tight penetration point for a drive shaft in at least one of the panels.

15 Claims, 4 Drawing Sheets

WATER-TIGHT DRIVE-PENETRATION COMPARTMENT

CROSS-REFERENCE TO RELATED APPLICATIONS

None.

BACKGROUND OF THE INVENTION

1. Field of the Invention

The present invention relates to amphibious vehicles, particularly to adaptations thereto for making the hulls of such vehicles water-resistant or water-tight.

2. Related Art

Amphibious vehicles, originally designed for military use, have become popular vehicles for sight-seeing tours and other civilian purposes. The vehicles, the bottoms of which comprise a buoyant hull, contain both wheels for land use as well as a propeller for water use. Given the heavy use that many such vehicles receive and the amount of time the vehicles are in the water, adaptations to make them less water-permeable will serve to improve safety and reliability, reducing the amount of time such vehicles must be taken out of service for repairs.

To protect it from the effects of water, the engines of such vehicles are situated inside of the hull. On the other hand the propeller and wheels must be situated outside of the hull. There must therefore be at least one penetration of the hull to transfer the power of the engine, via a drive shaft, to the wheels and propeller. This penetration, which in some cases is in an arched indentation in the underside of the hull, must be sealed in a water-tight connection to prevent the vehicle from taking on water. However, while remaining water-tight the connection must also permit movement of the drive shaft relative to the hull. In some amphibious vehicles there is a greased bearing through which the drive shaft penetrates the hull, and this bearing alone is what seals the hull. Nonetheless, considering that this bearing is exposed to hydrostatic pressure such a bearing can fail, leading to unchecked flooding of the hull.

Many amphibious vehicles that were built long ago for military use are still in service for civilian purposes. Many retrofitted improvements to the original design are added to the vehicles to improve the vehicles' safety and performance, which is important in light of the heavy use the vehicles receive.

Thus what is needed is an apparatus which permits penetration of one or more rotating shaft assemblies through the hull in a way that maintains a water-tight connection while permitting rotation of the shafts, and a method of retrofitting existing amphibious vehicles to accommodate this apparatus. This method and apparatus should protect the bearings from direct contact with water while also providing backup leakage protection in case of failure of any penetration points.

SUMMARY OF THE INVENTION

In one embodiment the invention is a water-tight compartment for containing a penetration point on the hull of an amphibious vehicle, comprising a bottom panel comprising the hull of the amphibious vehicle; a forward panel of the box comprising a forward bulkhead of the amphibious vehicle; a rearward panel of the box comprising a rearward bulkhead of the amphibious vehicle; two lateral panels; and a top panel; wherein the panels are joined together in a water-tight manner and wherein there is a water-tight penetration point for a drive shaft in at least one of the panels.

In another embodiment the invention is a method of retrofitting an amphibious vehicle to add a water-tight drive-penetration compartment to surround a gear transfer case, comprising the steps of attaching a front panel to the vehicle hull forward of the gear transfer case, the attaching being in a water-tight manner; attaching a rear panel to the vehicle hull rearward of the gear transfer case, the attaching being in a water-tight manner; attaching a pair of side panels to the vehicle hull on each lateral side of the gear transfer case, the attaching being in a water-tight manner; forming a ledge comprising the top edges of the front, rear, and side panels; and securing a top panel onto the ledge in a watertight manner.

In yet another embodiment the invention is a water-tight compartment for containing a penetration point on the hull of an amphibious vehicle, comprising a bottom panel comprising the hull of the amphibious vehicle; a forward panel of the box comprising a forward bulkhead of the amphibious vehicle; a rearward panel of the box comprising a rearward bulkhead of the amphibious vehicle; two lateral panels; and a top panel; wherein the bottom, forward, rearward, and lateral panels are joined together in a water-tight manner by welding; wherein there is a gasket disposed between the top panel and the forward, rearward, and lateral panels and the top panel is secured to the forward, rearward, and lateral panels in a removable, water-tight manner; wherein the top panel has at least one water-tight, removable access port disposed therein; wherein there is a first opening, the first opening being in the forward panel, the first opening being for entry of an engine drive shaft into the compartment, such that the engine drive shaft penetrates the first opening in a rotatable, water-tight manner; wherein there is a second opening, the second opening being in at least one of the forward panel and rearward panel, the second opening being for exit of an axle drive shaft leading to a front or rear axle of the amphibious vehicle, wherein the axle drive shaft penetrates the second opening in a rotatable, water-tight manner; wherein there is a third opening, the third opening being in the rearward panel, wherein the third opening is for the exit of a propeller drive shaft for driving a propeller, wherein the propeller drive shaft penetrates the third opening in a rotatable, water-tight manner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The point of connection of a driveshaft to the hull is a point of vulnerability in amphibious vehicles, in that any failure of this seal will cause the vehicle to leak and be taken out of service pending repair. One solution to this problem is to enclose the driveshaft in a hollow pipe which extends from the hull to the vehicle axle, where the drive shaft rotates freely within the non-rotating pipe. In order to permit the axle to move relative to the hull, the driveshaft and pipe must be able to move as well in a pivoting manner. Therefore, the connection between the pipe and the axle and between the pipe and the hull must be flexible. To enable this connection to be flexible yet water-tight the connection is encapsulated by a flexible rubber boot that is sealed to the pipe and to the hull or axle. Nonetheless, the seals or the boot can fail, leading to leakage of water into the pipe and subsequently into the hull of the vehicle.

Thus the compartment described herein provides a second layer of protection in the event that the front or rear drive shaft bearing seals should fail. Given the structure of the drive train of the vehicles, wherein the transfer case and drive shafts are all in a central portion of the hull, an efficient way to provide a second level of protection is to enclose the vehicle's transfer case within the compartment and to make water-tight all connections leading into and out of the compartment, as described herein.

Figure 1:
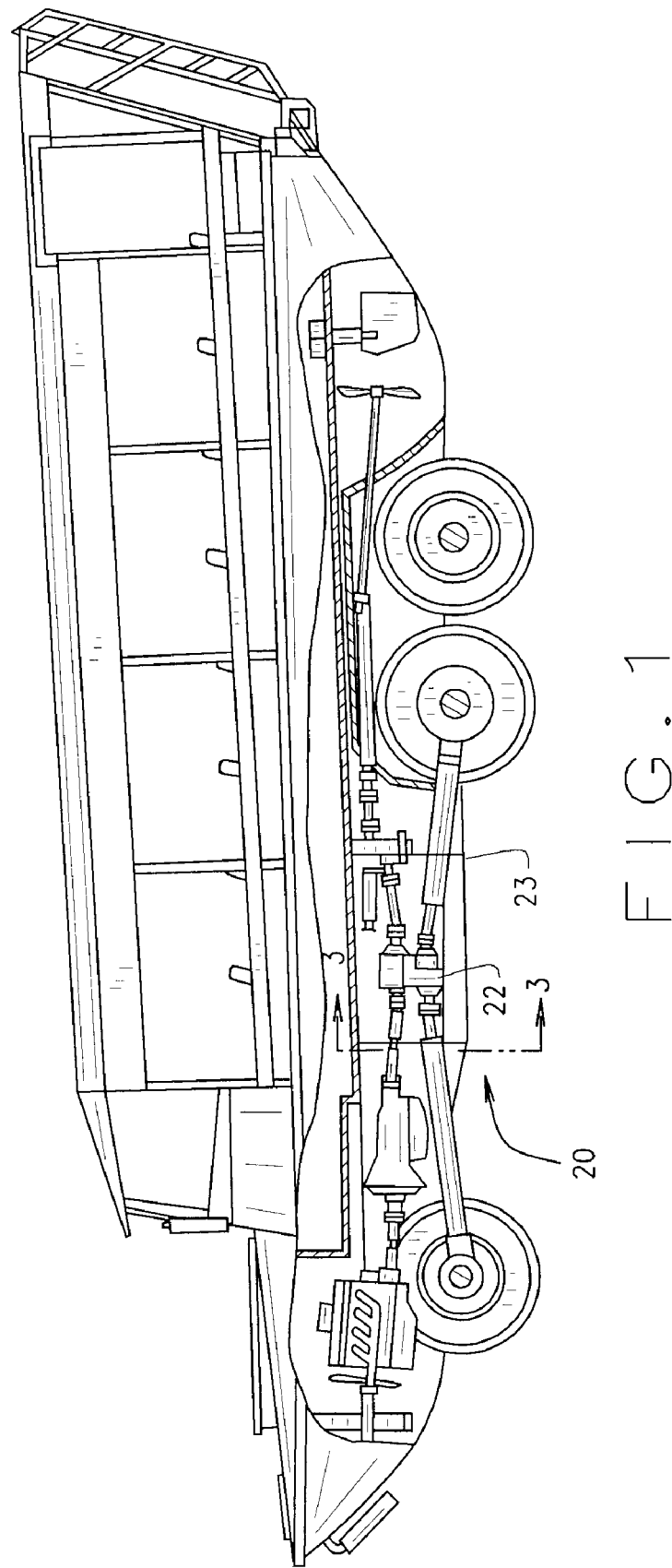
FIG. 1 shows a side view of an amphibious vehicle with a water-tight drive-penetration compartment fitted therein.

A water-tight drive-penetration compartment 20 of an amphibious vehicle comprises a plurality of sides for maintaining a transfer case 22 of the vehicle in a substantially water-free environment (FIG. 1). Transfer case 22 transfers power from a drive shaft leading from the vehicle engine to the wheels and propeller of the vehicle. Because in one embodiment there are three separate drive shafts, one each to drive the front axle, the rear axle, and the propeller, transfer case 22 is required to transfer power from the engine drive shaft to the other drive shafts. The sides of compartment 20 serve as water-tight penetration points into compartment 20 for the engine drive shaft and for drive shafts leading to the amphibious vehicle's front and rear axles and to the propeller shaft. Under normal conditions compartment 20 is dry and filled with air and compartment 20 will only fill with water if one of the drive shaft penetrations or other penetrations fail.

Figure 2:
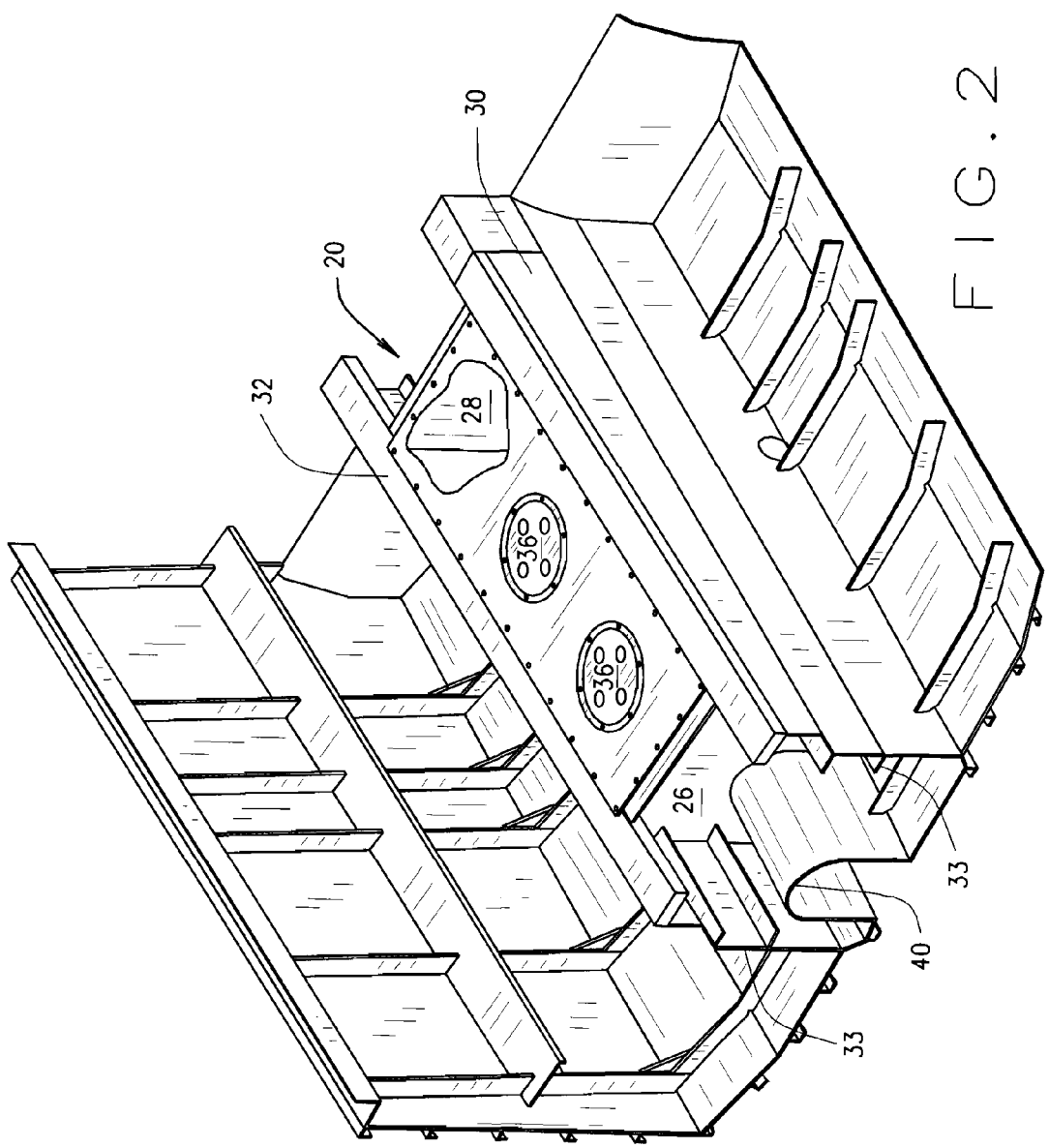
FIG. 2 shows a perspective view of the inside of an amphibious vehicle hull which has been retrofitted to add a water-tight drive-penetration compartment in accordance with the present invention.
Figure 3:
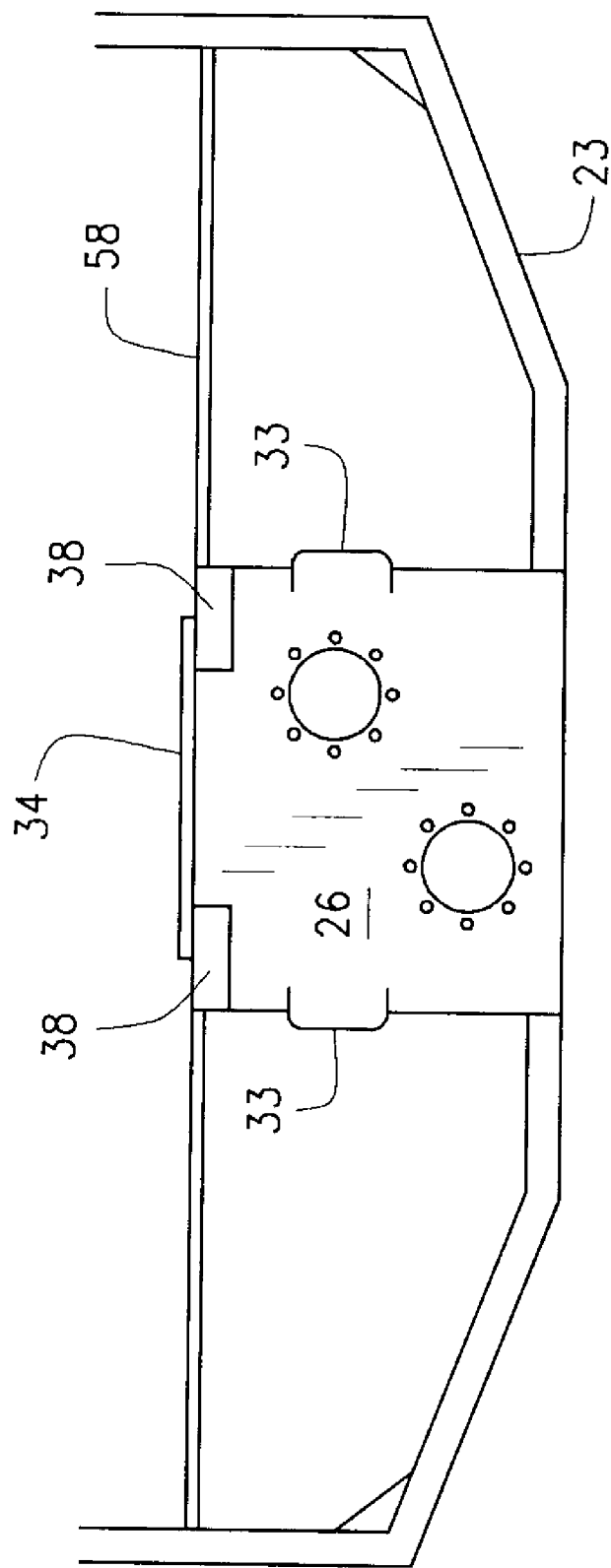
FIG. 3 shows a cross-section through the line 3-3 in FIG. 1 of the front end of a water-tight drive-penetration compartment.
Figure 4:
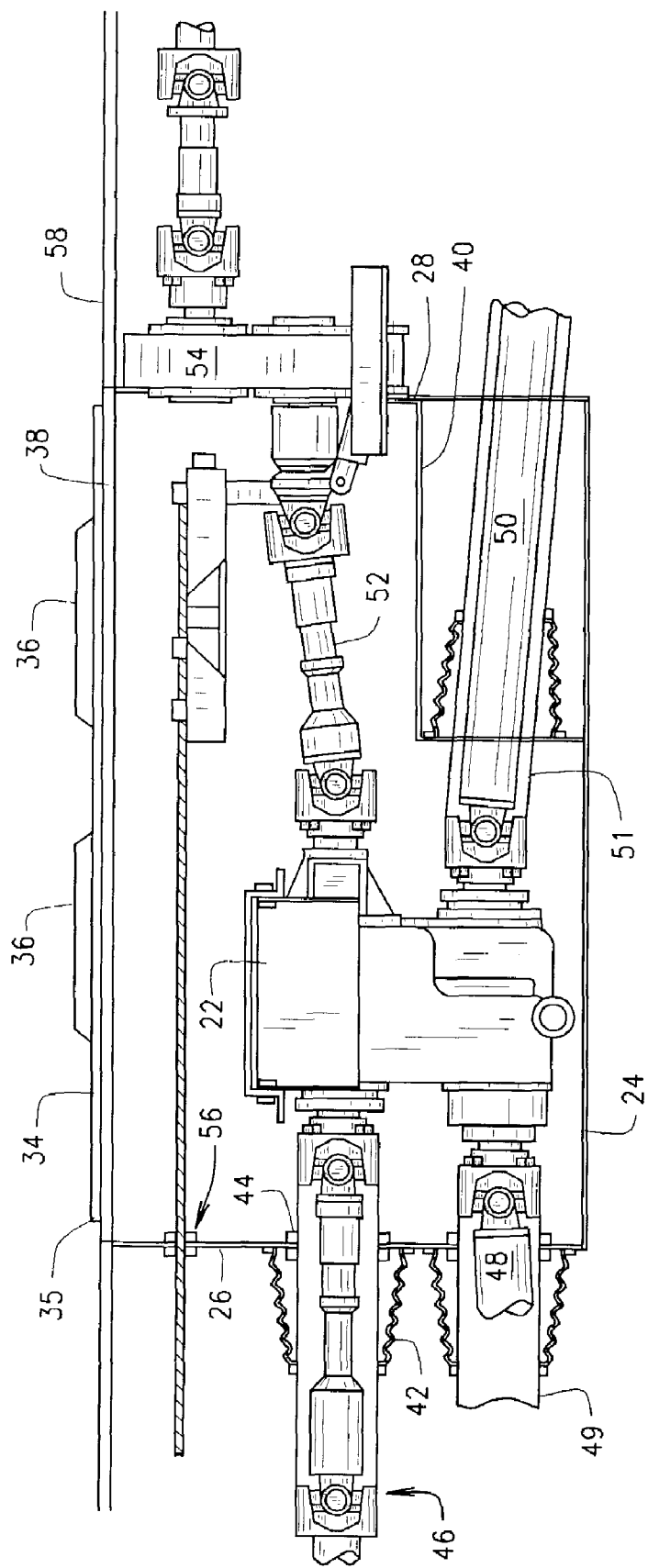
FIG. 4 shows a side view of the hull of an amphibious vehicle that has been retrofitted to add a water-tight drive-penetration compartment as in the present invention.

In a preferred embodiment compartment 20 has six sides to form a box-like enclosure (FIGS. 1-3) which surrounds transfer case 22. The bottom 24 comprises the hull 23 of the amphibious vehicle. The front side 26 and rear side 28 are bulkheads, and the lateral sides 30, 32 in one embodiment comprise a modification of the frame rails 33. The top 34 in one embodiment is an aluminum lid. Top 34 preferably has one or more access ports 36 to facilitate service and repair of transfer case 22 and other components contained in compartment 20 (FIGS. 2, 4).

The sides 24, 26, 28, 30, 32 are preferably metal, although any suitably sturdy and water-tight material will suffice. These sides 24, 26, 28, 30, 32 are preferably joined to one another in a water-tight manner, such as welding in the case of metal sides (FIG. 2). Top 34 is sealed to the remaining portion of compartment 20 preferably in a manner that is water-tight but which permits removal of top 34, such as the use of a gasket 35 or sealant along with a series of bolts. Such removal of top 34 might be required, for example, to permit complete removal and replacement of transfer case 22.

In one embodiment there are four major penetration points into compartment 20, wherein various drive shafts pass through openings in the panels. One such penetration point is for the incoming drive shaft 46 from the engine, which leads to transfer case 22 and which provides power for the wheels and propeller. The point at which the incoming drive shaft 46 from the engine penetrates the compartment 20 through the front side 26 bulkhead has a boot 42 and bearing 44 assembly which provides an additional level of water-tight protection. Two additional penetration points are for a front wheel drive shaft 48 and a rear wheel drive shaft 50 leading to the front and rear axles, respectively, which drive the wheels of the amphibious vehicle. Finally, another penetration point houses a drive shaft 52 that drives the propeller. The power from the transfer case 22 is transmitted to the propeller through a gearbox 54 that is attached, preferably by bolting, directly to rear side 28.

The penetrations to accommodate the front and rear drive shaft may be directly exposed to water when the vehicle is in the water, and thus these two penetrations are of greatest concern. In order to protect them from water, the front drive shaft 48 and rear drive shaft 50 are disposed within pipes 49, 51, wherein the pipes 49, 51 are sealed to the respective front and rear axles and to the hull by flexible rubber boots (FIG. 4). Nonetheless the respective drive shafts rotate freely within the pipes. Other, smaller penetrations 56 can also be made in compartment 20, for example to accommodate control cables, and are sealed in a water-tight manner using known methods. These smaller penetration points 56 may be less complicated than the aforementioned drive shafts since they do not have the complication of requiring a water-tight connection while also permitting rotation relative to compartment 20.

To permit cabling and plumbing components to be run between the front and rear of the amphibious vehicle without breaking the water-tight seal of compartment 20, one or more chase 38 is routed through compartment 20. In one embodiment chase 38 is a hollow tube, rectangular in cross-section, which runs between the bulkheads of front side 26 and rear side 28, near top 34. The interior of chase 38 is sealed off from the interior of compartment 20. In one embodiment chase 38 is a steel tube having a rectangular cross-section, which in one embodiment has cross-sectional dimensions of 2 inches by 6 inches.

Preferably all penetration points and all junctions between the side portions of compartment 20 are sealed in a water-tight manner. However, in the event of water leaking into compartment 20, for example through one of the front or rear axle drive shaft penetration points, the remaining seals of compartment 20 will prevent water from entering the amphibious vehicle itself. By sealing chase 38 from compartment 20 this maintains the wiring and plumbing components in chase 38 in a dry environment even in the event of a leak within compartment 20. This also prevents water inside compartment 20 from leaking via chase 38 into the amphibious vehicle. Without compartment 20, water leaking into the hull could fill the entire area under the deck 58 of the vehicle. With a sealed compartment 20 as described herein to restrict the region around the penetration points, only a small volume of space would be filled with water in the event of a penetration seal failure.

It is expected that compartment 20 will often be made by retrofitting into existing amphibious vehicles. To retrofit compartment 20 in one embodiment requires several modification steps. To the extent that the vehicle may already have structural frame rails 33 extending from the front to the rear of the vehicle above the hull, these rails 33 are modified to make them impermeable to water. In one embodiment the rails are supplemented above and below with additional steel plates which are then welded to the hull on the bottom side, to the rail in the middle, and at the top form a ledge onto which top 34 is attached. In another embodiment where the vehicle does not have appropriate frame rails, side plates are attached to the hull at the bottom and on the side edges to the front and rear bulkheads (see below). In addition, the side plates may be secured to the underside of the flooring or deck 58 of the vehicle. Additional structural bracing may be added as needed. The upper plate which forms the ledge may be combined with a hollow steel tube to form the cable chase 38 as discussed above. In one embodiment, chase 38 is made to be in-line and flush with the structural framework that holds up the flooring on the bottom of the passenger compartment.

An additional modification to an existing amphibious vehicle that may be required is the addition of front and rear bulkheads, which make up the front 26 and rear 28 walls of compartment 20. The bulkheads are custom-fitted to match the cross-section of the particular area in which they are installed, including arch-shaped openings to match the arch-shaped indentations 40 in the hull through which the front and rear drive shafts penetrate. The bulkhead panels meet with and are welded to the hull on the bottom, the frame rails and frame rail panels (or just to the side panels if no frame rails are present) on the sides, and an additional ledge portion on the top, the latter part forming part of the ledge onto which top 34 is attached.

The bottom portion of compartment 20 is made up of the hull, including the previously-mentioned arched openings for the front and rear axle drive shaft penetrations. Finally, as discussed above the top 34 of the compartment is a removable panel that is attached in a water-tight manner. All of the aforementioned attachments are made in a water-tight manner, for example by welding.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A water-tight compartment for containing a penetration point on the hull of an amphibious vehicle, comprising:
   a bottom panel comprising the hull of the amphibious vehicle;
   a forward panel of the box comprising a forward bulkhead of the amphibious vehicle;
   a rearward panel of the box comprising a rearward bulkhead of the amphibious vehicle;
   two lateral panels; and
   a top panel;
   wherein the panels are joined together in a water-tight manner and wherein there is a water-tight penetration point for a drive shaft in at least one of the panels;
   wherein there is a first opening, the first opening being in the forward panel, the first opening being for entry of an engine drive shaft into the compartment, such that the engine drive shaft penetrates the first opening in a rotatable, water-tight manner; and further
   wherein there is a second opening, the second opening being in at least one of the forward panel and rearward panel, the second opening being for exit of an axle drive shaft leading to a front or rear axle of the amphibious vehicle, wherein the axle drive shaft penetrates the second opening in a rotatable, water-tight manner.

2. The water-tight compartment of claim 1 wherein there is a third opening, the third opening being in the rearward panel, wherein the third opening is for the exit of a propeller drive shaft for driving a propeller, wherein the propeller drive shaft penetrates the third opening in a rotatable, water-tight manner.

3. The water-tight compartment of claim 2 wherein the top panel is removable.

4. The water-tight compartment of claim 3 wherein the top panel has at least one water-tight, removable access port disposed therein.

5. The water-tight compartment of claim 4 wherein there is a gasket disposed adjacent to the top panel.

6. The water-tight compartment of claim 5 wherein the bottom, forward, rearward, and lateral panels are joined together by welding.

7. The water-tight compartment of claim 6 further comprising a wiring chase extending adjacent to the top panel from the forward panel to the rearward panel, the wiring chase being sealed from the water-tight compartment in a water-tight manner.

8. The water-tight compartment of claim 7 wherein the wiring chase comprises a hollow tube.

9. The water-tight compartment of claim 8 further comprising a penetration in at least one of the forward panel and the rearward panel for a control cable.

10. A method of retrofitting an amphibious vehicle to add a water-tight drive-penetration compartment to surround a gear transfer case, comprising the steps of:
    attaching a front panel to the vehicle hull forward of the gear transfer case, the attaching being in a water-tight manner;
    attaching a rear panel to the vehicle hull rearward of the gear transfer case, the attaching being in a water-tight manner;
    attaching a pair of side panels to the vehicle hull on each lateral side of the gear transfer case, the attaching being in a water-tight manner;
    forming a ledge comprising the top edges of the front, rear, and side panels; and
    securing a top panel onto the ledge in a watertight manner; and
    further comprising the step of mounting a hollow wiring chase adjacent the top panel and extending from the front panel to the rear panel, wherein the wiring chase is sealed from the water-tight drive-penetration compartment in a water-tight manner.

11. The method of claim 10 wherein securing a top panel further comprises disposing a gasket between the top panel and the ledge.

12. The method of claim 11 wherein attaching a pair of side panels further comprises attaching flat plates between the hull and a structural side rail and from the structural side rail to the ledge.

13. A water-tight compartment for containing a penetration point on the hull of an amphibious vehicle, comprising:
- a bottom panel comprising the hull of the amphibious vehicle;
- a forward panel of the box comprising a forward bulkhead of the amphibious vehicle;
- a rearward panel of the box comprising a rearward bulkhead of the amphibious vehicle;
- two lateral panels; and
- a top panel;
- wherein the bottom, forward, rearward, and lateral panels are joined together in a water-tight manner by welding;
- wherein there is a gasket disposed between the top panel and the forward, rearward, and lateral panels and the top panel is secured to the forward, rearward, and lateral panels in a removable, water-tight manner;
- wherein the top panel has at least one water-tight, removable access port disposed therein;
- wherein there is a first opening, the first opening being in the forward panel, the first opening being for entry of an engine drive shaft into the compartment, such that the engine drive shaft penetrates the first opening in a rotatable, water-tight manner;
- wherein there is a second opening, the second opening being in at least one of the forward panel and rearward panel, the second opening being for exit of an axle drive shaft leading to a front or rear axle of the amphibious vehicle, wherein the axle drive shaft penetrates the second opening in a rotatable, water-tight manner;
- wherein there is a third opening, the third opening being in the rearward panel, wherein the third opening is for the exit of a propeller drive shaft for driving a propeller, wherein the propeller drive shaft penetrates the third opening in a rotatable, water-tight manner.

14. The water-tight compartment of claim 13 further comprising a wiring chase extending adjacent to the top panel from the forward panel to the rearward panel, the wiring chase comprising a hollow tube, the wiring chase being sealed from the water-tight compartment in a water-tight manner.

15. The water-tight compartment of claim 14 further comprising a penetration in at least one of the forward panel and the rearward panel for a control cable.

* * * * *